(12) United States Patent
Yalamanchili et al.

(10) Patent No.: US 12,141,843 B2
(45) Date of Patent: *Nov. 12, 2024

(54) METHOD AND APPARATUS FOR ADVERTISEMENT INFORMATION ERROR DETECTION AND CORRECTION

(71) Applicant: Walmart Apollo, LLC, Bentonville, AR (US)

(72) Inventors: Krishna Yalamanchili, San Jose, CA (US); Abilash Amarthaluri, San Jose, CA (US); Vishal Parmar, Fremont, CA (US); Cecilia Seto, San Francisco, CA (US)

(73) Assignee: Walmart Apollo, LLC, Bentonville, AR (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/226,675

(22) Filed: Apr. 9, 2021

(65) Prior Publication Data
US 2021/0248649 A1 Aug. 12, 2021

Related U.S. Application Data

(63) Continuation of application No. 16/204,721, filed on Nov. 29, 2018, now Pat. No. 10,997,635.

(51) Int. Cl.
*G06Q 30/00* (2023.01)
*G06Q 30/0241* (2023.01)

(52) U.S. Cl.
CPC ..... *G06Q 30/0276* (2013.01); *G06Q 30/0277* (2013.01)

(58) Field of Classification Search
None
See application file for complete search history.

(56) References Cited

U.S. PATENT DOCUMENTS 8,356,036 B2 1/2013 Bechtel et al.
8,510,329 B2 8/2013 Balkir et al.
(Continued)

OTHER PUBLICATIONS

IP.com NPL Search Strategy (Year: 2021).*
(Continued)

*Primary Examiner* — Matthew T Sittner
(74) *Attorney, Agent, or Firm* — Morgan, Lewis & Bockius LLP; Manita Rawat

(57) ABSTRACT

An advertising system is provided and generally includes a computing device that can receive attribute data from a plurality of information sources for an item. The computing device can determine a first number of sources for which the same attribute value for an attribute of the item is received, and can determine a second number of sources for which any attribute value for the same attribute of the item is received. The computing device can generate an attribute confidence value for the attribute based on the first number of sources and the second number of sources, indicating how likely the attribute value for the attribute is correct. The computing device can determine an item confidence value for the item based on multiple attribute confidence values for the item. Based on the item confidence value, the computing device may provide an attribute error signal indicating an attribute value error.

14 Claims, 6 Drawing Sheets

(56) References Cited

U.S. PATENT DOCUMENTS

| | | | |
|---|---|---|---|
| 9,501,503 B2 | 11/2016 | Mitra et al. | |
| 2006/0111964 A1 | 5/2006 | Bingham et al. | |
| 2007/0156891 A1* | 7/2007 | Abbott | G06Q 30/02 |
| | | | 709/224 |
| 2008/0147590 A1* | 6/2008 | Bechtel | G16H 50/70 |
| | | | 706/59 |
| 2012/0310874 A1 | 12/2012 | Dantressangle et al. | |
| 2015/0348160 A1 | 12/2015 | Subrahmanya et al. | |
| 2016/0353993 A1* | 12/2016 | Grubis | A61B 5/02055 |
| 2017/0277692 A1 | 9/2017 | Gungor et al. | |
| 2018/0288757 A1* | 10/2018 | Sun | H04B 7/088 |
| 2019/0138384 A1 | 5/2019 | Nair et al. | |
| 2019/0327331 A1* | 10/2019 | Natarajan | G06F 7/14 |
| 2019/0370746 A1* | 12/2019 | Martinos | H04L 67/10 |
| 2020/0050966 A1* | 2/2020 | Enuka | G06Q 10/10 |

OTHER PUBLICATIONS

STIC EIC 3600 Search Report for parent U.S. Appl. No. 16/204,721 (similar claims) dated May 13, 2020 (Year: 2020).*
STIC EIC 3600 Search Report for U.S. Appl. No. 16/204,721 dated May 13, 2020.

* cited by examiner

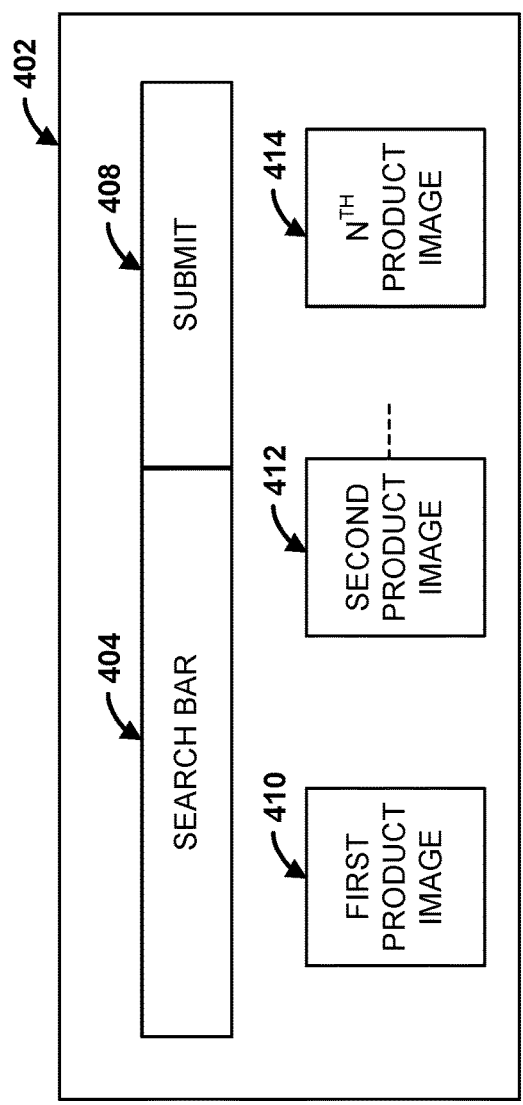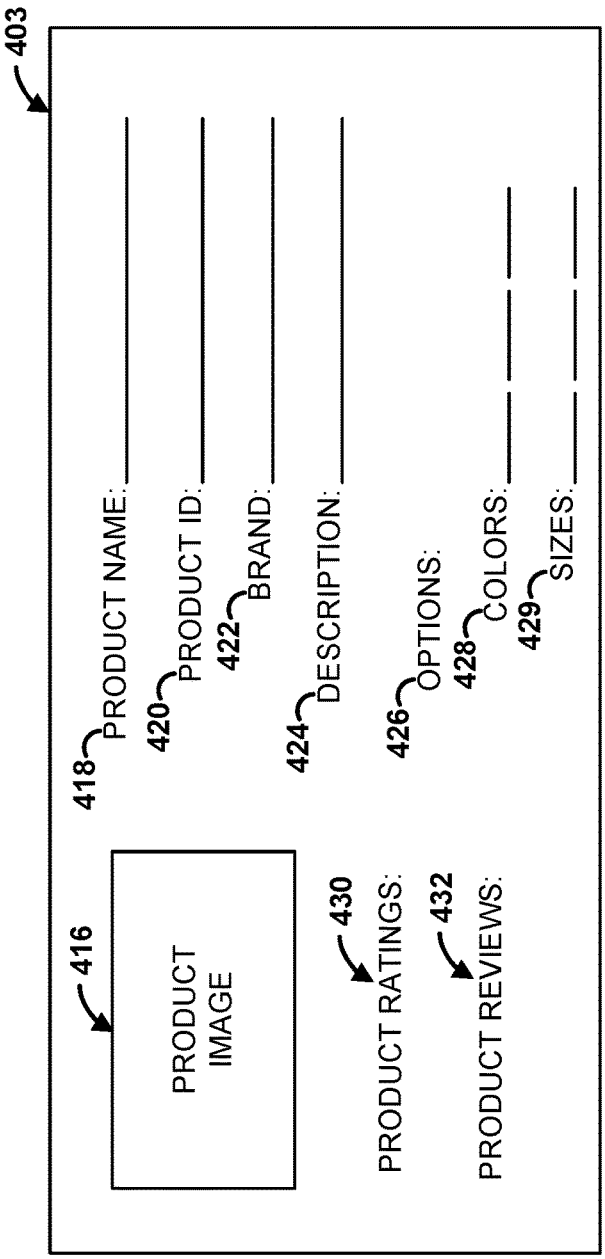

METHOD AND APPARATUS FOR ADVERTISEMENT INFORMATION ERROR DETECTION AND CORRECTION

CROSS-REFERENCE TO RELATED APPLICATIONS

This application is a continuation of, and claims priority to, U.S. patent application Ser. No. 16/204,721, filed on Nov. 29, 2018 and entitled "METHOD AND APPARATUS FOR ADVERTISEMENT INFORMATION ERROR DETECTION AND CORRECTION," which is hereby incorporated by reference in its entirety.

TECHNICAL FIELD

The disclosure relates generally to advertising and, more specifically, to detecting and correcting inaccurate advertisement information.

BACKGROUND

Online retailers typically provide information on their websites about the products or services they are offering for sale. For example, an online retailer may display on a website an image of a product, along with information about that product. The information may include, for example, a title of the product, a description of the product, the brand of the product, and information on various other attributes of the product (e.g., size, color, product identification number, manufacturers serial number, etc.). Some online retailers may also provide on their websites additional images of the product, and ratings or reviews of the product. An online retailer may receive the information from one or more sources. For example, the information may be received from the manufacturer of a product, a provider of a service, or a third-party that provides information for the product or service. Often times, however, the information may contain inaccuracies. For example, information relating to one or more attributes of an item, such as the brand or manufacturer of the item, may be incorrect. Retailers may nonetheless display the incorrect attribute information on their websites. As such, there are opportunities to address inaccuracies with advertisement information provided on a retailer's website.

SUMMARY

The embodiments described herein allow for the detection and correction of inaccurate advertisement information, such as inaccurate attribute information related to an item (e.g., a product or service). As a result, customers are not misinformed or misled with respect to that item's attribute information. In addition, an online retailer incorporating one or more of the embodiments can benefit from increased sales of the item, as a customer may be more willing to purchase an item that is advertised with accurate attribute information. Other benefits would also be recognized by those skilled in the art.

For example, in some embodiments, a computing device is communicatively coupled to a database and a plurality of sources, where each of the plurality of sources include at least one server. The computing device is configured to determine an attribute confidence value for a first attribute of an item based on a first number of sources of the plurality of sources reporting a first attribute value for the item and on a second number of sources of the plurality of sources reporting any other attribute value for the item. The computing device is also configured to obtain, from the database, a first source weight for a first source of the first number of sources. Further, the computing device is configured to apply the first source weight to the attribute confidence value to generate an adjusted attribute confidence value. The computing device is also configured to determine an item confidence value for the item based, at least partially, on the adjusted attribute confidence value for the first attribute of the item. The computing device is further configured to store the item confidence value for the item in the database. The computing device is configured to generate an attribute error signal indicating an error with the first attribute value based on the determined item confidence value. Further, the computing device is configured to transmit the attribute error signal to the first source of the first number of sources to adjust the first attribute value based on the indicated error.

In some embodiments, a method by a computing device includes determining an attribute confidence value for a first attribute of an item based on a first number of sources of a plurality of sources reporting a first attribute value for the item and on a second number of sources of the plurality of sources reporting any other attribute value for the item. The method also includes obtaining, from a database, a first source weight for a first source of the first number of sources. The method further includes applying the first source weight to the attribute confidence value to generate an adjusted attribute confidence value. The method also includes determining an item confidence value for the item based, at least partially, on the adjusted attribute confidence value for the first attribute of the item. Further, the method includes storing the item confidence value for the item in the database. The method includes generating an attribute error signal indicating an error with the first attribute value based on the determined item confidence value. The method also includes transmitting the attribute error signal to the first source of the first number of sources to adjust the first attribute value based on the indicated error.

In some examples a non-transitory, computer-readable storage medium includes executable instructions that, when executed by one or more processors, cause the one or more processors to perform operations including determining an attribute confidence value for a first attribute of an item based on a first number of sources of a plurality of sources reporting a first attribute value for the item and on a second number of sources of the plurality of sources reporting any other attribute value for the item. The operations also include obtaining, from a database, a first source weight for a first source of the first number of sources. The operations further include applying the first source weight to the attribute confidence value to generate an adjusted attribute confidence value. The operations also include determining an item confidence value for the item based, at least partially, on the adjusted attribute confidence value for the first attribute of the item. Further, the operations include storing the item confidence value for the item in the database. The operations include generating an attribute error signal indicating an error with the first attribute value based on the determined item confidence value. The operations also include transmitting the attribute error signal to the first source of the first number of sources to adjust the first attribute value based on the indicated error.

BRIEF DESCRIPTION OF THE DRAWINGS

The features and advantages of the present disclosures will be more fully disclosed in, or rendered obvious by the following detailed descriptions of example embodiments.

The detailed descriptions of the example embodiments are to be considered together with the accompanying drawings wherein like numbers refer to like parts and further wherein:

FIGS. 4A and 4B are illustrations of a display of various attributes of items, in accordance with some embodiments;

DETAILED DESCRIPTION

Figure 1:
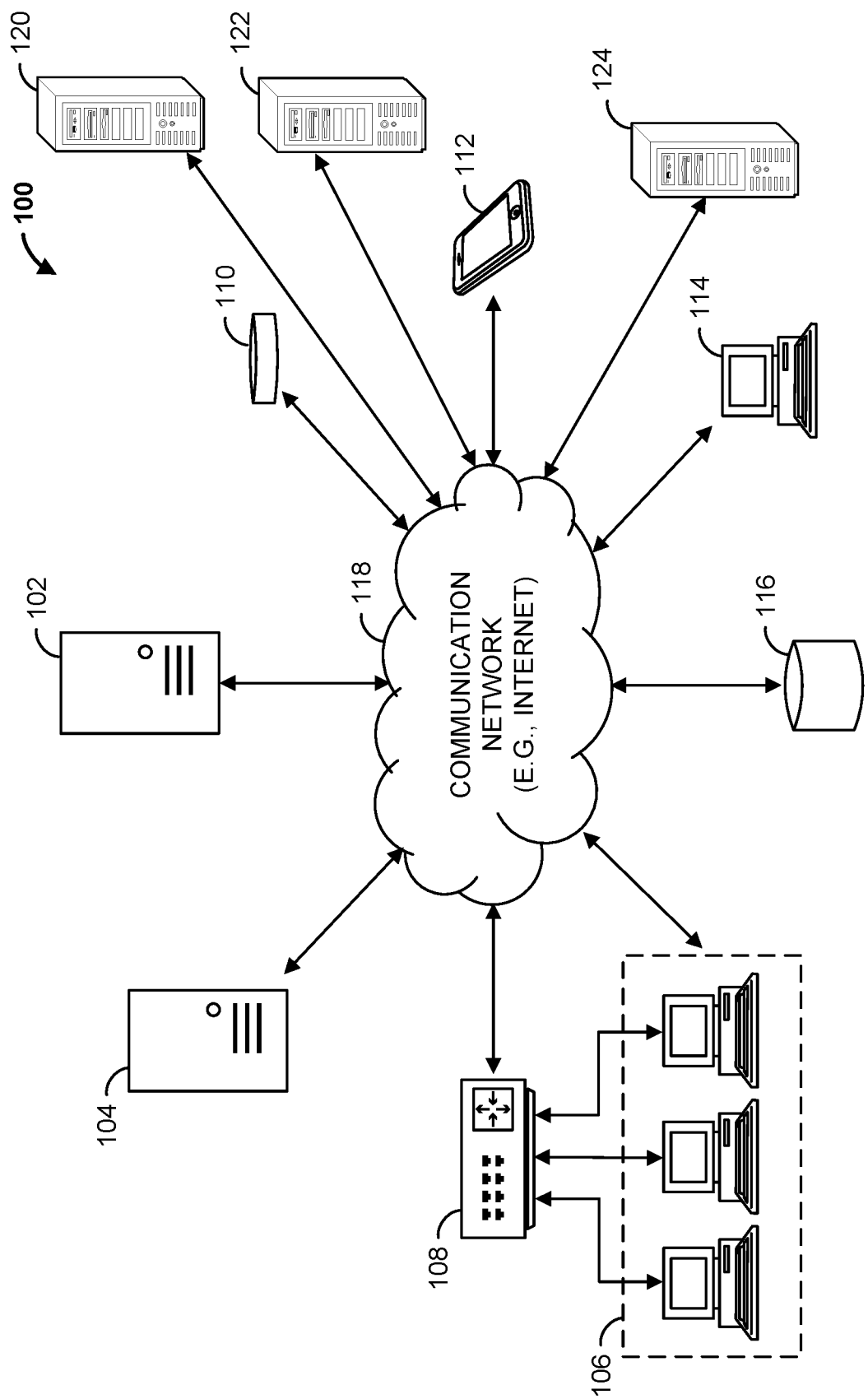
FIG. 1 is a block diagram of an advertising system in accordance with some embodiments.

The description of the preferred embodiments is intended to be read in connection with the accompanying drawings, which are to be considered part of the entire written description of these disclosures. While the present disclosure is susceptible to various modifications and alternative forms, specific embodiments are shown by way of example in the drawings and will be described in detail herein. The objectives and advantages of the claimed subject matter will become more apparent from the following detailed description of these exemplary embodiments in connection with the accompanying drawings.

It should be understood, however, that the present disclosure is not intended to be limited to the particular forms disclosed. Rather, the present disclosure covers all modifications, equivalents, and alternatives that fall within the spirit and scope of these exemplary embodiments. The terms "couple," "coupled," "operatively coupled," "operatively connected," and the like should be broadly understood to refer to connecting devices or components together either mechanically, electrically, wired, wirelessly, or otherwise, such that the connection allows the pertinent devices or components to operate (e.g., communicate) with each other as intended by virtue of that relationship.

Turning to the drawings, FIG. 1 illustrates a block diagram of an advertising system 100 that includes an advertising computing device 102 (e.g., a server, such as an application server), a server (e.g., a web server) 104, workstation(s) 106, database 116, information source devices 120, 122, 124, and multiple customer computing devices 110, 112, 114 operatively coupled over network 118. Advertising computing device 102, web hosting device 104, and multiple customer computing devices 110, 112, 114 can each be any suitable computing device that includes any hardware or hardware and software combination for processing and handling information. In addition, each can transmit data to, and receive data from, communication network 118.

For example, advertising computing device 102 can be a computer, a workstation, a laptop, a mobile device such as a cellular phone, a cloud-based server, or any other suitable device. Each of multiple customer computing devices 110, 112, 114 can be a mobile device such as a cellular phone, a laptop, a computer, a table, a personal assistant device, a voice assistant device, a digital assistant, or any other suitable device.

Additionally, each of advertising computing device 102, server 104, and multiple customer computing devices 110, 112, 114 can include one or more processors, one or more field-programmable gate arrays (FPGAs), one or more application-specific integrated circuits (ASICs), one or more state machines, digital circuitry, or any other suitable circuitry.

Although FIG. 1 illustrates three customer computing devices 110, 112, 114, advertising system 100 can include any number of customer computing devices 110, 112, 114. Similarly, advertising system 100 can include any number of workstation(s) 106, advertising computing devices 102, web servers 104, information source devices 120, 122, 124, and databases 116.

Workstation(s) 106 are operably coupled to communication network 118 via router (or switch) 108. For example, workstation(s) 106 can communicate with advertising computing device 102 over communication network 118. The workstation(s) 106 can allow for the configuration and/or programming of advertising computing device 102, such as the controlling and/or programming of one or more processors of advertising computing device 102. Workstation(s) 106 may also communicate with server 104. For example, server 104 may be a web server that hosts one or more web pages, such as a retailer's website. Workstation(s) 106 may be operable to access and program (e.g., configure) the webpages hosted by server 104.

Advertising computing device 102 is operable to communicate with database 116 over communication network 118. For example, advertising computing device 102 can store data to, and read data from, database 116. Database 116 can be a remote storage device, such as a cloud-based server, a memory device on another application server, a networked computer, or any other suitable remote storage. Although shown remote to advertising computing device 102, in some examples database 116 can be a local storage device, such as a hard drive, a non-volatile memory, or a USB stick.

Communication network 118 can be a WiFi® network, a cellular network such as a 3GPP® network, a Bluetooth® network, a satellite network, a wireless local area network (LAN), a network utilizing radio-frequency (RF) communication protocols, a Near Field Communication (NFC) network, a wireless Metropolitan Area Network (MAN) connecting multiple wireless LANs, a wide area network (WAN), or any other suitable network. Communication network 118 can provide access to, for example, the Internet.

Advertising computing device 102 can also communicate with first customer computing device 110, second customer computing device 112, and Nth customer computing device 114 over communication network 118. Similarly, first customer computing device 110, second customer computing device 112, and Nth customer computing device 114 are operable to communicate with advertising computing device 102 over communication network 118. For example, advertising computing device 102 can receive data (e.g., messages) from, and transmit data to, first customer computing device 110, second customer computing device 112, and Nth customer computing device 114.

In some examples, advertising computing device 102 and workstation(s) 106 can be operated by a retailer, while customer computing devices 110, 112, 114 can be computing devices operated by customers of a retailer. In some examples, customer computing devices 110, 112, 115 are operable to view and interact with a website hosted on server 104. For example, customer computing devices 110, 112, 115 may be operable to conduct a search on a website hosted by server 104 by communicating with server 104 over communication network 118.

Information source devices 120, 122, 124 may be any suitable computing device, such as a server, that provides attribute information for one or more items. For example, information source devices 120, 122, 124 may be operated by a manufacturer of a product, and may provide information, such as attribute information, about the product to a retailer of that product. In some examples, the information source devices 120, 122, 124 may be operated by a third-party that provides product or service attribute information. A retailer may subscribe to a service offered by the third-party to receive attribute information for products and services. The retailer may receive attributive information for products or services the retailer offers on a website, such as a website hosted by server 104. In some examples, advertising computing device 102 is operable to receive attribute information for one or more items from one or more information source devices 120, 122, 124.

Advertising system 100 allows for the detection, and correction, of inaccurate attribute information. For example, advertising system 100 may generate an item confidence score for an attribute value reported for a particular item from a particular information source device 120, 122, 124, as described further below. The item confidence score indicates a level of confidence in the accuracy of the attribute value. Based on the item confidence score, advertising system 100 may generate an item attribute error for the attribute value. Advertising system 100 may provide the item attribute error to, for example, the operator of the particular information source 120, 122, 124 so that the attribute value may be checked and corrected if necessary.

Figure 2:
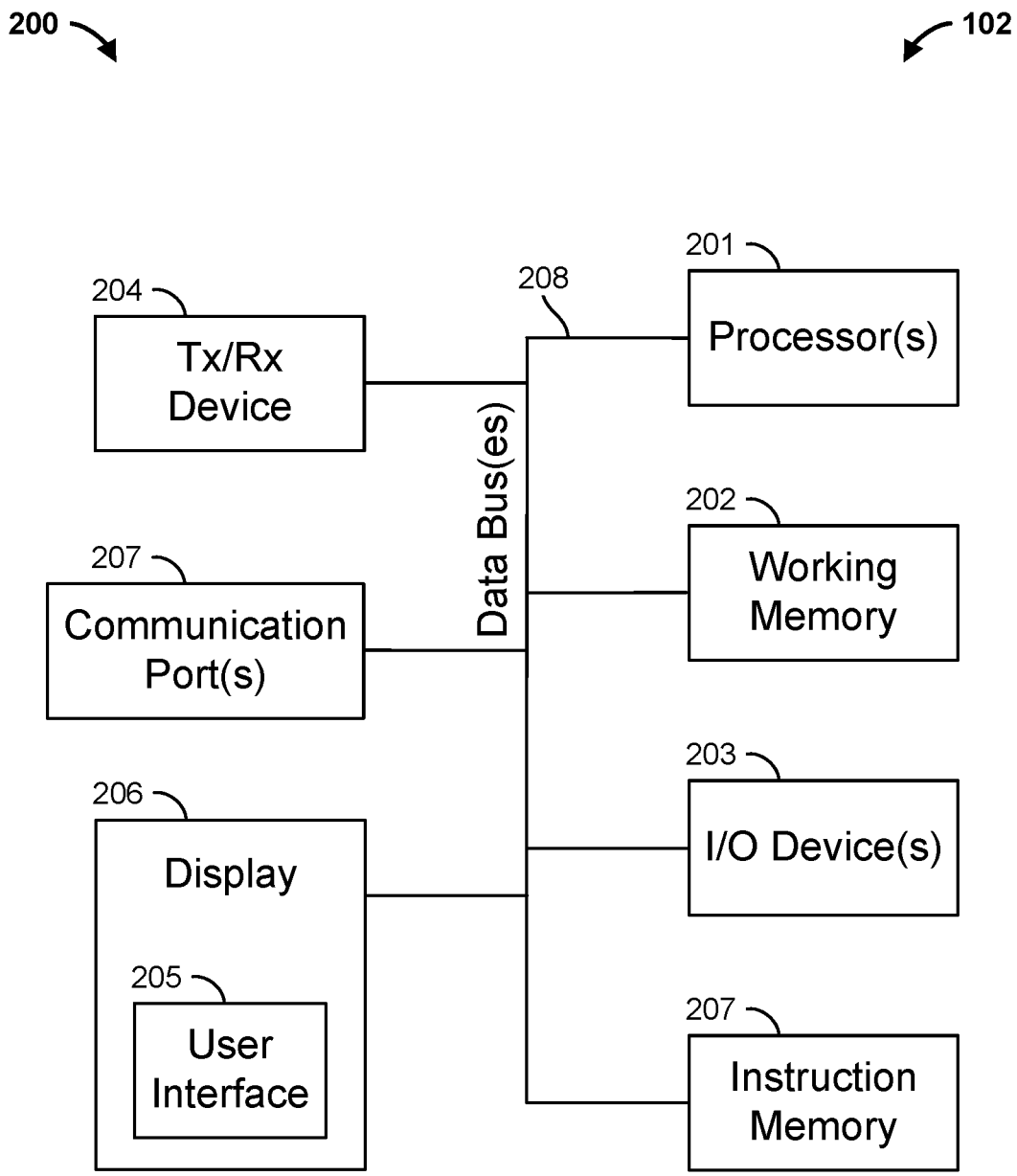
FIG. 2 is a block diagram of the advertising computing device of the advertising system of FIG. 1 in accordance with some embodiments.

FIG. 2 illustrates the advertising computing device 102 of FIG. 1. Advertising computing device 102 can include one or more processors 201, working memory 202, one or more input/output devices 203, instruction memory 207, a transceiver 204, one or more communication ports 207, and a display 206, all operatively coupled to one or more data buses 208. Data buses 208 allow for communication among the various devices. Data buses 208 can include wired, or wireless, communication channels.

Processor(s) 201 can include one or more distinct processors, each having one or more cores. Each of the distinct processors can have the same or different structure. Processor(s) 201 can include one or more central processing units (CPUs), one or more graphics processing units (GPUs), application specific integrated circuits (ASICs), digital signal processors (DSPs), and the like.

Processor(s) 201 can be configured to perform a certain function or operation by executing code, stored on instruction memory 207, embodying the function or operation. For example, processor(s) 201 can be configured to perform one or more of any function, method, or operation disclosed herein.

Instruction memory 207 can store instructions that can be accessed (e.g., read) and executed by processor(s) 201. For example, instruction memory 207 can be a non-transitory, computer-readable storage medium such as a read-only memory (ROM), an electrically erasable programmable read-only memory (EEPROM), flash memory, a removable disk, CD-ROM, any non-volatile memory, or any other suitable memory.

Processor(s) 201 can store data to, and read data from, working memory 202. For example, processor(s) 201 can store a working set of instructions to working memory 202, such as instructions loaded from instruction memory 207. Processor(s) 201 can also use working memory 202 to store dynamic data created during the operation of advertising computing device 102. Working memory 202 can be a random access memory (RAM) such as a static random access memory (SRAM) or dynamic random access memory (DRAM), or any other suitable memory.

Input-output devices 203 can include any suitable device that allows for data input or output. For example, input-output devices 203 can include one or more of a keyboard, a touchpad, a mouse, a stylus, a touchscreen, a physical button, a speaker, a microphone, or any other suitable input or output device.

Communication port(s) 207 can include, for example, a serial port such as a universal asynchronous receiver/transmitter (UART) connection, a Universal Serial Bus (USB) connection, or any other suitable communication port or connection. In some examples, communication port(s) 207 allows for the programming of executable instructions in instruction memory 207. In some examples, communication port(s) 207 allows for the transfer (e.g., uploading or downloading) of data, such as data to be transmitted to and stored in database 116.

Display 206 can display user interface 205. User interfaces 205 can enable user interaction with advertising computing device 102. For example, user interface 205 can be a user interface for an application executed by processor(s) 201. In some examples, a user can interact with user interface 205 by engaging input-output devices 203. In some examples, display 206 can be a touchscreen, where user interface 205 is displayed on the touchscreen.

Transceiver 204 allows for communication with a network, such as the communication network 118 of FIG. 1. For example, if communication network 118 of FIG. 1 is a cellular network, transceiver 204 is configured to allow communications with the cellular network. In some examples, transceiver 204 is selected based on the type of communication network 118 advertising computing device 102 will be operating in. Processor(s) 201 is operable to receive data from, or send data to, a network, such as communication network 118 of FIG. 1, via transceiver 204.

Figure 3:
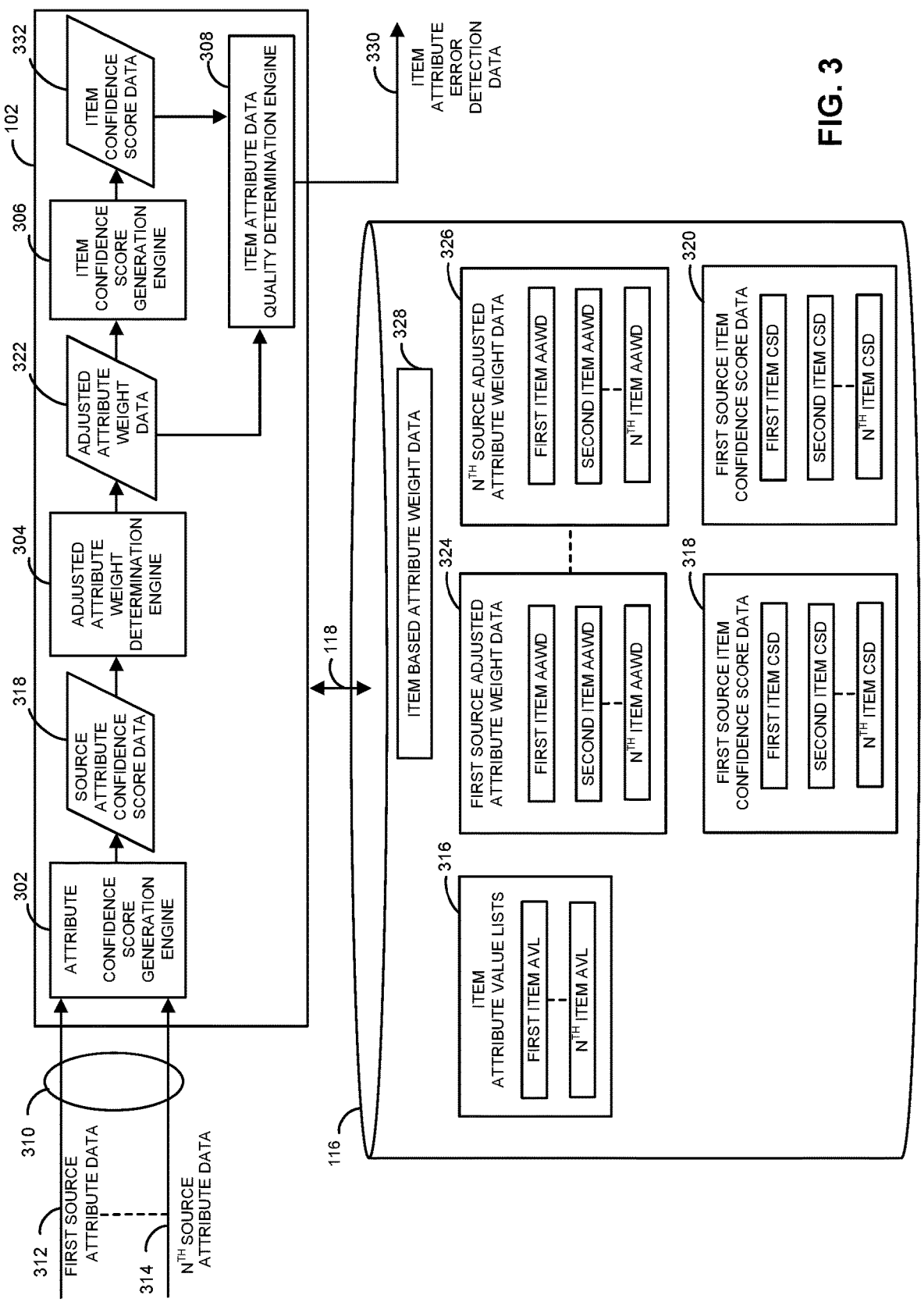
FIG. 3 is a block diagram illustrating an example of various portions of the advertising system of FIG. 1, in accordance with some embodiments.

FIG. 3 is a block diagram illustrating an example of various portions of the advertising system 100 of FIG. 1. As indicated in the diagram, advertising computing device 102 is operably coupled to database 116 over communication network 118. Advertising computing device 102 includes attribute confidence score generation engine 302, adjusted attribute weight determination engine 304, item confidence score generation engine 306, and item attribute data quality determination engine 308. In some examples, some or all of attribute confidence score generation engine 302, adjusted attribute weight determination engine 304, item confidence score generation engine 306, and item attribute data quality determination engine 308 are implemented in processor(s) 201 of FIG. 2, and in executable instructions executed by processor(s) 201. In some examples, some or all of attribute confidence score generation engine 302, adjusted attribute weight determination engine 304, item confidence score generation engine 306, and item attribute data quality determination engine 308 can be implemented in hardware, such as digital circuitry, FPGAs, ASICs, state machines, or any other suitable hardware.

Attribute confidence score generation engine 302 is operable to receive source attribute data 310 from a plurality of information source devices, such as from information source devices 120, 122, 124 of FIG. 1. Source attribute data 310 may include item attribute data for one or more items that are offered for purchase on a retailer's website, such as a website hosted on server 104, for example. Source attribute data 310 may include any data related to an item, or to the sale of the item. For example, source attribute data may include a title of an item, a brand of the item, a description of the item, options for the purchase of the item (e.g., color, size), a product identification number of the item, or any other data related to the item. Source attribute data 310 may include first source attribute data 312 from a first information source provider (e.g., via information source device 120, 122, 124), and Nth source attribute data 314 from another information source provider (e.g., via information source device 120, 122, 124).

Source attribute data 310 may include attribute data for one or more items. For example, each of first source attribute data 312 and Nth source attribute data 314 may include attribute values for one or more attributes of the same item. In some examples, first source attribute data 312 may include attribute values for attributes of an item, while Nth source attribute data 314 may not include attribute values for those same attributes for that same item. Similarly, in some examples, Nth source attribute data 312 may include attribute values for certain attributes of an item, while first source attribute data 314 may not include attribute values for those same attributes for that same item.

Attribute confidence score generation engine 302 may receive source attribute data 310, and determine a source attribute confidence score for each attribute value received. For example, attribute confidence score generation engine 302 may determine a source attribute confidence score for each attribute value received for each item from each information source device 120, 122, 124.

(e.g., all, or a predefined number of, such as 5, 15, etc.)

In some examples, attribute confidence score generation engine 302 generates a source attribute confidence score for an attribute value of an attribute of an item based on a ratio of the number of information source devices 120, 122, 124 providing the same attribute value for the same attribute of the same item, to the number of information source devices 120, 122, 124 providing any attribute value (e.g., the same or not the same) for the same attribute of the same item. In some examples, the attribute values provided from all information source devices 120, 122, 124 is considered. In some examples, the attribute values provided from a predefined number (e.g., 5, 15, etc.) of information source devices 120, 122, 124 is considered. Attribute confidence score generation engine 302 may generate source attribute confidence scores, for example, by executing the following equation:

$$\text{Source attribute confidence score}(a_x) = N\_cv/N\_tv \quad \text{(eq. 1)}$$

where:
- $a_x$ represents a particular attribute value "x" received from a particular information source "a"
- $N\_cv$ is the number of occurrences that the same attribute value received from a particular source is received for a same attribute from multiple sources;
- $N\_tv$ is the number of occurrences that any attribute value received from the particular source is received for a same attribute from multiple sources For example, assume a first information source provides an attribute value for a brand of an item as "Brand A," and thirteen other information sources provide an attribute value for the brand of the same item as "Brand B." Attribute confidence score generation engine 302 may compute the source attribute confidence score for the brand attribute for the first information source, based on the equation above, as $1/14 = 0.0714 = 7.14\%$, which indicates a lower confidence score. In other words, one out of fourteen sources provided the attribute value of "Brand A" for the brand of the item. Likewise, attribute confidence score generation engine 302 may compute the source attribute confidence score for the brand attribute for any of the other thirteen information sources, based on the equation above, as $13/14 = 0.9286 = 92.86\%$, which indicates a higher confidence score.

In some examples, attribute confidence score generation engine 302 generates source attribute confidence scores for an attribute value of an attribute of an item based on whether the attribute value matches an attribute value in an item attribute value list, which may be predefined. For example, an item may have a corresponding item attribute value list that includes possible attribute values for one or more attributes of the item. The attribute value lists may be maintained, for example, in database 116, such as item attribute value lists 316. Attribute confidence score generation engine 302 may compare a received attribute value for a particular attribute of a particular item to one or more attribute values in a corresponding item attribute value list for that item. If the received attribute value matches an attribute value from the corresponding attribute value list, attribute confidence score generation engine 302 generates a high source attribute confidence score for that attribute value, such as 100%. Otherwise, if the received attribute value does not match any of the attribute values in the corresponding attribute value list, attribute confidence score generation engine 302 generates a low source attribute confidence score for that attribute value, such as 0%.

In some examples, attribute confidence score generation engine 302 generates a source attribute confidence score for an attribute value of an attribute of an item based on whether the attribute value correlates (e.g., matches) with a search term used by a user online, such as on a retailer's website, to search for the item. The generated source attribute confidence score may be proportional to the number of times the attribute value correlates with the search term. For example, if the correlating search term was searched a threshold number of times, or is at least a threshold percentage of all search terms used to search for the item, attribute confidence score generation engine 302 generates a high source attribute confidence score for that attribute value, such as 100%. Otherwise, if the correlating search term was not searched at least a threshold number of times, or is not at least a threshold percentage of all search terms used to search for the item, attribute confidence score generation engine 302 generates a low source attribute confidence score for that attribute value, such as 0%.

In some examples, attribute confidence score generation engine 302 generates a source attribute confidence score for an attribute value of an attribute of an item based on whether the attribute value correlates (e.g., matches) with an attribute value that a user engaged (e.g., clicked on) while browsing retailer's website. The generated source attribute confidence score may be proportional to the number of times the attribute value is engaged. For example, the attribute value may have been listed in an advertisement of the product. If the correlating attribute value was engaged a threshold number of times, or was engaged at least a threshold percentage of all engagements of the item, attribute confidence score generation engine 302 generates a high source attribute confidence score for that attribute value, such as 100%.

In some examples, attribute confidence score generation engine 302 adjusts the source attribute confidence scores based a source weight associated with the information source device 120, 122, 124 providing the attribute value for the attribute of the item. For example, attribute confidence score generation engine 302 may generate a source weight for source attribute data 310 received from an information source device 120, 122, 124 based on a ratio of a number of times attribute values received from that information source are correct, to the total number of attribute values provided by that source. For example, attribute confidence score generation engine 302 may apply the following equation to determine the source weight for an information source:

$$\text{Source weight} = N\_svc/N\_tnvs \qquad (\text{eq. 2})$$

where:
- $N\_svc$ is the number of times an information source's value is determined to be correct,
- $N\_tnvx$ is the total number of attribute values provided by that information source An information source's attribute value may be determined to be correct if more than a threshold number of information sources, such as 50% of information source providers, provide the same attribute value. For example, if at least a threshold number of information sources provide the same attribute value for a same attribute of a same item, attribute confidence score generation engine 302 may determine that the source's value is correct; otherwise, it may determine that the source's value is not correct. The source weight may be determined for a particular information source based on determining whether provided attribute values for the same item are correct, or based on determining whether provided attribute values for a plurality of items are correct.

In some examples, an information source's attribute value may be determined to be correct if the attribute value was curated manually. A manual curation may be indicated, for example, as part of source attribute data 310. In some examples, an information source's attribute value may be determined to be correct if the attribute value is provided by an attribute extraction source, which may use machine-learning models to extract attribute values. In some examples, the precision must be greater than a certain threshold (e.g., 80%) for the attribute value to be determined to be correct. In some examples, an information source's attribute value may be determined to be correct if the attribute value is provided by the manufacture of the item (e.g., by an information source device 120, 122, 124 operated or owned by the manufacturer of the item).

Attribute confidence score generation engine 302 provides source attribute confidence score data 318 identifying the generated source attribute confidence scores to adjusted attribute weight determination engine 304. Adjusted attribute weight determination engine 304 obtains item based attribute weight data 328 from database 116. Item based attribute weight data 328 identifies attribute weights (e.g., a percentage) for attributes of an item. Attribute weights may identify the weight given to the presence of a particular attribute value for a particular item. In other words, attribute weights may signify the importance of the presence of an attribute value for a particular attribute of an item.

For example, a first attribute weight (e.g., a percentage) may correspond to a brand of an item, a second attribute weight may correspond to a description of the item, and a third attribute weight may correspond to a title of the item, for example. Each of the attribute weights may be different. Item based attribute weight data 328 may define attribute weights based on item type (e.g., all products of the same product type receive the same attribute weights for the same attribute of those products), item category (e.g., phones) or sub-category (e.g., phones by a particular manufacturer), or the individual item. Item based attribute weight data 328 may include attribute weights for a plurality of attributes, which may be predefined.

Attribute weight determination engine 304 adjusts the attribute weights identified by item based attribute weight data 328 based on the source attribute confidence scores identified by source attribute confidence score data 318. In some examples, attribute weight determination engine 304 multiplies the attribute weight for each attribute of an item by its corresponding source attribute confidence score to generate an adjusted attribute weight. For example, if an attribute weight for an item identified by item based attribute weight data 328 indicates 60%, and the corresponding source attribute confidence score for the attribute value of the attribute is 50%, attribute weight determination engine 304 generates an adjusted attribute weight for that attribute of the item of 30% (60%*50%=30%). As another example, if an attribute weight for an item identified by item based attribute weight data 328 indicates 60%, and the corresponding source attribute confidence score for the attribute value of the attribute is 100%, attribute weight determination engine 304 generates an adjusted attribute weight for that attribute of the item of 60% (60%*100%=60%).

In some examples, if no source attribute confidence score was generated for an attribute identified by item based attribute weight data 328 (e.g., no attribute value for the attribute was obtained), then the adjusted attribute weight for that attribute is the lowest possible value for attribute weights (e.g., 0%). In some examples, if a source attribute confidence score generated for an attribute is the lowest possible source attribute confidence score (e.g., 0), then the adjusted attribute weight for that attribute is determined to be the lowest possible value for attribute weights (e.g., 0).

Attribute weight determination engine 304 provides adjusted attribute weight data 322 identifying the adjusted attribute weights. Attribute weight determination engine 304 may also store the generated adjusted attribute weights in database 116. For example, adjusted attribute weights generated based on first source attribute data 312 may be stored in database 116 as first source adjusted attribute weight data 324. Similarly, adjusted attribute weights generated based on Nth source attribute data 314 may be stored in database 116 as Nth source adjusted attribute weight data 326.

Item confidence score generation engine 306 may generate an item confidence score for an item for a particular information source device 120, 122, 124 based on the adjusted attribute weights identified by adjusted attribute weight data 322 for that item. For example, item confidence score generation engine 306 may combine (e.g., add) all of the adjusted attribute weights identified by adjusted attribute weight data 322 for a particular item whose attribute information was received from a particular information source device 120, 122, 124. The item confidence score may identify a level of confidence in the accuracy of the attributes of the item from the particular information source device 120, 122, 124.

Item confidence score generation engine 306 provides item confidence score data 332 identifying the generated item confidence scores to item attribute data quality determination engine 308. Item confidence score generation engine 306 may also store the generated item confidence scores in database 116. For example, item confidence scores generated based on first source attribute data 312 may be stored in database 116 as first source item confidence score data 318. Similarly, item confidence scores generated based on Nth source attribute data 314 may be stored in database 116 as Nth source item confidence score data 320.

Item attribute data quality determination engine 308 is operable to provide item attribute error detection data 330 identifying an attribute value error, such as an attribute value inaccuracy or an attribute value inconsistency, of an attribute value received via source attribute data 310. Item attribute data quality determination engine 308 may generate item attribute error detection data 330 for an attribute value of an item received from a particular information source device 120, 122, 124 based at least on adjusted attribute weight data 322 and item confidence score data 332 corresponding to the attribute value of the item. In some examples, item attribute data quality determination engine 308 generates an attribute value error if the item confidence score identified by item confidence score data 332 is beyond a threshold amount (e.g., below a certain percentage, such as 70%). In some examples, item attribute data quality determination engine 308 generates an attribute value error if any one of the adjusted weights identified by adjusted attribute weight data 322 is beyond a threshold amount (e.g., below a certain percentage, such as 20%).

In some examples, item attribute data quality determination engine 308 provides the item attribute error detection data 330 to the provider of the attribute data, such as information source device 120, 122, 124. In this manner, the provider of the attribute value is notified of the attribute value error. In some examples, advertising computing device 102 logs an indication of the item attribute error identified by item attribute error detection data 330. For example, advertising computing device 102 may log the item attribute error in database 116, may send an email or text message (e.g., via short message service (SMS)) to a user of the system or provider of the attribute value, or may log the item attribute error in a transaction log. Upon notification, an operator of advertising computing device 102 may act on the item attribute error, such as by notifying the provider of the attribute value, or by correcting the item attribute error, such as by updating the attribute value which may be stored, for example, in database 116.

FIGS. 4A and 4B illustrate items and corresponding attributes of those items that may be displayed, for example, on display 206. For example, with reference to FIG. 4A, server 104 may present a webpage 402 on display 206. In some examples, display 206 may be a touchscreen display. Webpage 402 may be a webpage on a retailer's website, such as one hosted by server 104. Webpage 402 includes a search bar 404, which allows a user to search the retailer's website based on input provided to the search bar 404. The input may include, for example, one or more search terms. A user may provide the input with the use of, for example, I/O device 203. The user may initiate a search request by providing the input to the search bar 404 and selecting the "Submit" icon 408. The search request may include search terms that identify an item, such as a product, or an attribute of an item, such as a brand, for example. In this example, website 402 displays product images 410, 412, 414 in response to the search request. For example, the search request may have included a type of a product. In response, webpage 402 displays first product image 410, second product image 412, up to Nth product image 414, which may be images for products related to the type of product searched for. In some examples, first product image 410, second product image 412, up to Nth product image 414 include attribute information about their corresponding products, such as brand information, product name information, product description information, for example.

Assuming a user selects one of the product images 410, 412, 414 (e.g., the user clicks on the product image), FIG. 4B illustrates a webpage 404 that includes attribute information of the corresponding product. For example, webpage 403 may display a product image 416 of the corresponding product. In some examples, product image 416 is the same image as the selected image of product images 410, 412, 414 in FIG. 4A. Webpage 403 further includes attributes such as a product name 418 of the product, a product identification (ID) 420 of the product, a brand 422 of the product, and a description 424 of the product. Webpage 403 may also include attribute information directed to optional features 426 of the product. For example, optional features 426 for the product may include color options 428 or size options 429. Attribute information may also include product ratings 430, such as ratings by third-parties (e.g., rating organizations), internal ratings, or customer ratings. Attribute information may also include product reviews 432, such as product reviews by customers or third-parties. Source attribute data 310 may include data related to any one or more of any of these attributes, or any other attributes, of an item.

Figure 5:
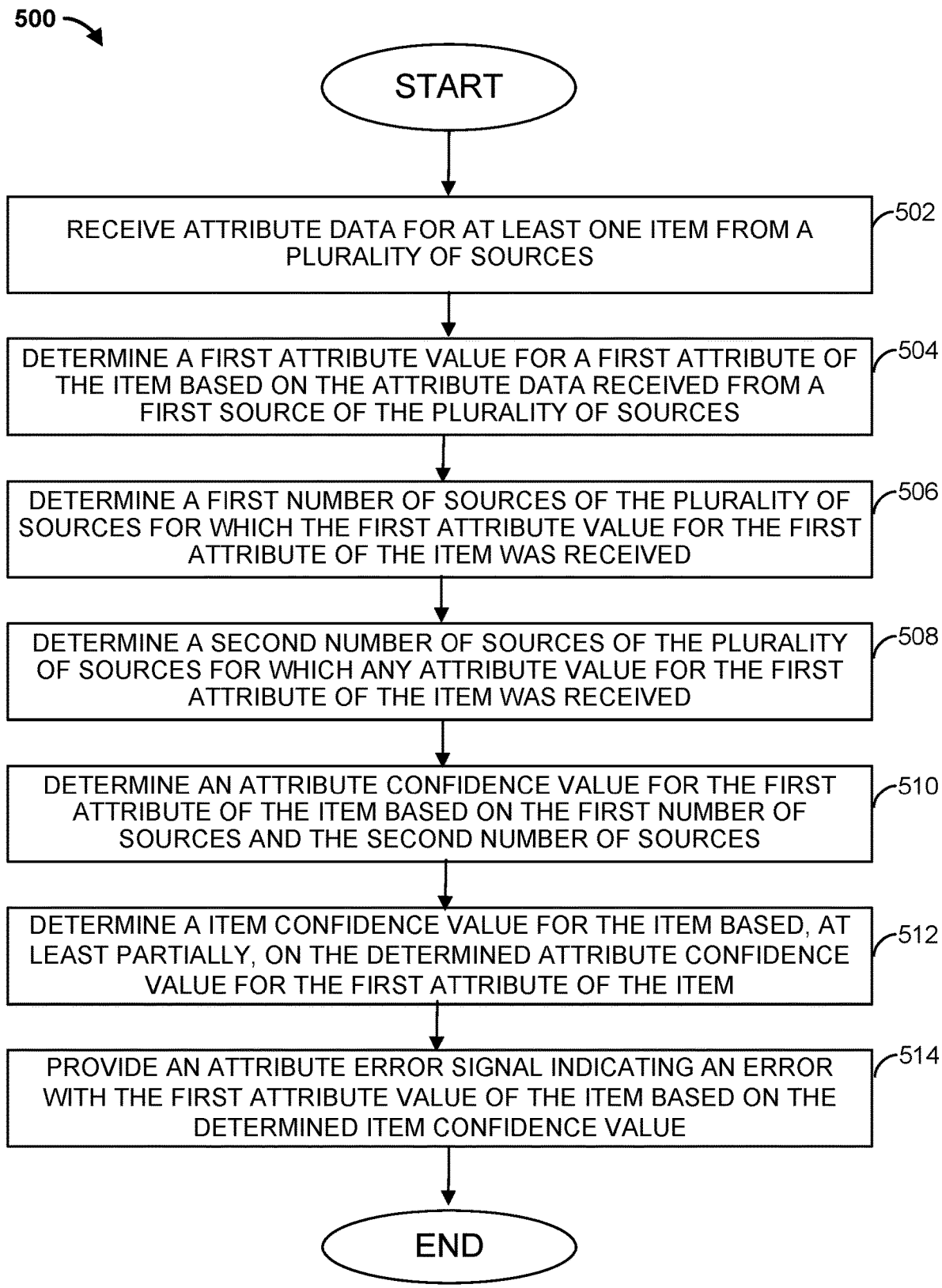
FIG. 5 is a flowchart of an example method that can be carried out by the advertising system of FIG. 1 in accordance with some embodiments.

FIG. 5 is a flowchart of an example method 500 that can be carried out by the advertising computing device 102 of FIG. 1. Beginning at step 502, attribute data for an item is received from a plurality of information sources. For example, advertising computing device 102 may receive first source attribute data 312 from a first information source device, and Nth source attribute data 314 from another information source device. At step 504, a first attribute value is determined for a first attribute of the item. The first attribute value is determined based on the attribute data received from one of the plurality of information sources. At step 506, a first number of information sources is determined. The first number of information sources identifies the number of information sources for which the same first attribute value for the first attribute of the one item was received. At step 508, a second number of information sources is determined. The second number of information sources identifies the number of information sources for which any attribute value, including the first attribute value, for the first attribute of the item was received.

Proceeding to step 510, an attribute confidence value for the first attribute is determined based on the first number of information sources and the second number of information sources. At step 512, an item confidence value for the item is determined based, at least partially, on the attribute confidence value determined in step 510. For example, the item confidence value may be based on the combination of attribute confidence values for various attributes of the item. At step 514, an attribute error signal is provided based on the determined item confidence value. The attribute error signal may indicate an error with the first attribute value of the item. For example, the attribute error signal may be provided to the information source of the first attribute value so that the first attribute value may be verified and/or corrected.

Figure 6:
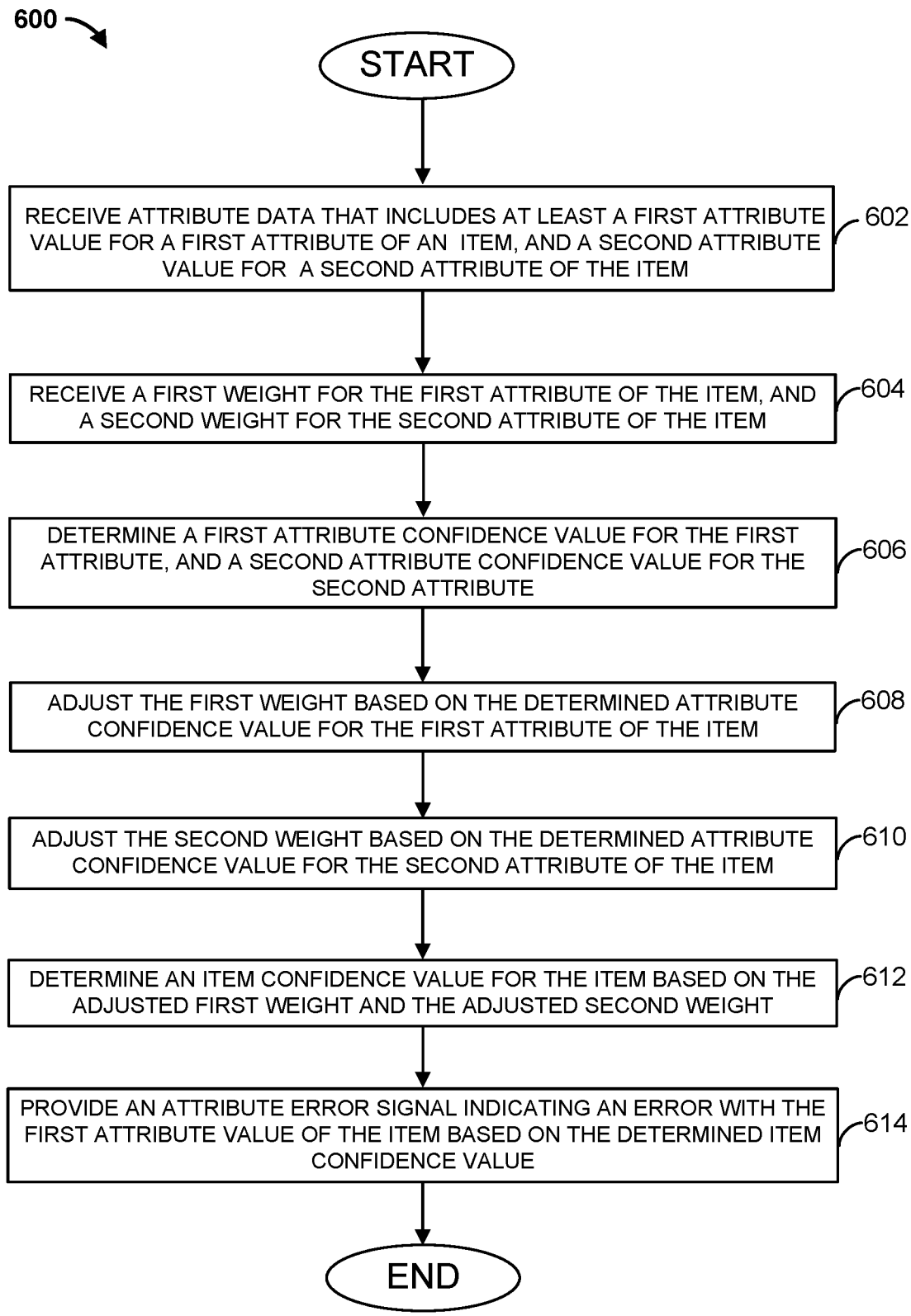
FIG. 6 is a flowchart of another example method that can be carried out by the advertising system of FIG. 1 in accordance with some embodiments.

FIG. 6 is a flowchart of another example method 600 that can be carried out by the advertising computing device 102 of FIG. 1. At step 602, attribute data is received from a plurality of information sources for an item. The attribute data includes at least a first attribute value for a first attribute of an item, and a second attribute value for a second attribute of the item, each received from the same information source. At step 604, a first weight for the first attribute of the item, and a second weight for the second attribute of the item, are received. For example, the first and second weights may be obtained from a database, such as database 116. At step 606, a first attribute confidence value for the first attribute, and a second attribute confidence value for the second attribute, are determined. For example, the first and second attribute confidence values may be computed based on a number of information source providers that provide the same attribute value for the same attribute of the same item, and a number of information source providers that provide any attribute value for the same attribute of the same item, respectively.

At step 608, the first weight is adjusted based on the determined attribute confidence value for the first attribute of the item. For example, the first weight may be adjusted by multiplying the first weight with the attribute confidence value for the first attribute of the item. At step 610, the second weight is adjusted based on the determined attribute confidence value for the second attribute of the item. For example, the second weight may be adjusted by multiplying the second weight with the attribute confidence value for the second attribute of the item. At step 612, an item confidence value is determined for the item based on the adjusted first weight and the adjusted second weight. For example, the item confidence value may be the addition of the adjusted first weight and the adjusted second weight. At step 614, an attribute error signal is provided based on the item confidence value. For example, if the item confidence value is beyond (e.g., below) a threshold amount, the attribute error signal may be provided.

Although the methods described above are with reference to the illustrated flowcharts, it will be appreciated that many other ways of performing the acts associated with the methods can be used. For example, the order of some operations may be changed, and some of the operations described may be optional.

In addition, the methods and system described herein can be at least partially embodied in the form of computer-implemented processes and apparatus for practicing those processes. The disclosed methods may also be at least partially embodied in the form of tangible, non-transitory machine-readable storage media encoded with computer program code. For example, the steps of the methods can be embodied in hardware, in executable instructions executed by a processor (e.g., software), or a combination of the two. The media may include, for example, RAMs, ROMs, CD-ROMs, DVD-ROMs, BD-ROMs, hard disk drives, flash memories, or any other non-transitory machine-readable storage medium. When the computer program code is loaded into and executed by a computer, the computer becomes an apparatus for practicing the method. The methods may also be at least partially embodied in the form of a computer into which computer program code is loaded or executed, such that, the computer becomes a special purpose computer for practicing the methods. When implemented on a general-purpose processor, the computer program code segments configure the processor to create specific logic circuits. The methods may alternatively be at least partially embodied in application specific integrated circuits for performing the methods.

The foregoing is provided for purposes of illustrating, explaining, and describing embodiments of these disclosures. Modifications and adaptations to these embodiments will be apparent to those skilled in the art and may be made without departing from the scope or spirit of these disclosures.

What is claimed is:

1. A system comprising:
a computing device communicatively coupled to a database and a plurality of sources, wherein each of the plurality of sources comprise at least one server, and wherein the computing device is configured to:
determine an attribute confidence value for a first attribute of an item based on a first number of sources of the plurality of sources reporting a first attribute value for the item and on a second number of sources of the plurality of sources reporting any other attribute value for the item;
obtain, from the database, a first source weight for a first source of the first number of sources;
apply the first source weight to the attribute confidence value to generate an adjusted attribute confidence value;
determine an item confidence value for the item based, at least partially, on the adjusted attribute confidence value for the first attribute of the item;
store the item confidence value for the item in the database;
generate an attribute error signal indicating an error with the first attribute value based on the determined item confidence value;
adjust the attribute confidence value based on whether previously received attribute values from the first source are correct; and
determine the item confidence value for the item based, at least partially, on the adjusted attribute confidence value;
determine one of a ratio of a number of times the previously received attribute values from the first source are correct to a total number of the previously received attribute values from the first source or a ratio of the plurality of sources that have provided a same attribute value for each of the previously received attribute values; and
determine, for each of the previously received attribute values, that they are correct if the determined ratio is beyond a threshold value; and
transmit the attribute error signal to the first source of the first number of sources to adjust the first attribute value based on the indicated error.

2. The system of claim 1, wherein the computing device is configured to:
receive a first weight for the first attribute of the item;
adjust the first weight based, at least partially, on the determined attribute confidence value for the first attribute of the item; and
determine the item confidence value for the item based, at least partially, on the adjusted first weight.

3. The system of claim 1, wherein applying the first source weight to the attribute confidence value to generate the adjusted attribute confidence value comprises:
adjusting the first source weight based, at least partially, on the first number of sources and the second number of sources;
storing the adjusted first source weight in the database; and
applying the adjusted first source weight to the attribute confidence value to generate the adjusted attribute confidence value.

4. The system of claim 1, wherein the computing device is configured to determine the attribute confidence value for the first attribute of the item based on a ratio of the first number of sources to the second number of sources.

5. The system of claim 1, wherein the computing device is configured to:
determine whether the item confidence value for the item is beyond a threshold value; and
provide the attribute error signal indicating the error with the first attribute of the item if the determined item confidence value is beyond the threshold value.

6. A method by a computing device communicatively coupled to a database and a plurality of sources, wherein each of the plurality of sources comprise at least one server, the method comprising:
 determining an attribute confidence value for a first attribute of an item based on a first number of sources of the plurality of sources reporting a first attribute value for the item and on a second number of sources of the plurality of sources reporting any other attribute value for the item;
 obtaining, from the database, a first source weight for a first source of the first number of sources;
 applying the first source weight to the attribute confidence value to generate an adjusted attribute confidence value;
 determining an item confidence value for the item based, at least partially, on the adjusted attribute confidence value for the first attribute of the item;
 storing the item confidence value for the item in the database;
 generating an attribute error signal indicating an error with the first attribute value based on the determined item confidence value;
 transmitting the attribute error signal to the first source of the first number of sources to adjust the first attribute value based on the indicated error;
 adjusting the attribute confidence value based on whether previously received attribute values from the first source are correct;
 determining the item confidence value for the item based, at least partially, on the adjusted attribute confidence value;
 determining a ratio of a number of times the previously received attribute values from the first source are correct to a total number of the previously received attribute values from the first source; and
 determining, for each of the previously received attribute values, that they are correct if the determined ratio is beyond a threshold value.

7. The method of claim 6 comprising:
 receiving a first weight for the first attribute of the item;
 adjusting the first weight based, at least partially, on the determined attribute confidence value for the first attribute of the item; and
 determining the item confidence value for the item based, at least partially, on the adjusted first weight.

8. The method of claim 6 wherein applying the first source weight to the attribute confidence value to generate the adjusted attribute confidence value comprises:
 adjusting the first source weight based, at least partially, on the first number of sources and the second number of sources;
 storing the adjusted first source weight in the database; and
 applying the adjusted first source weight to the attribute confidence value to generate the adjusted attribute confidence value.

9. The method of claim 6 comprising determining the attribute confidence value for the first attribute of the item based on a ratio of the first number of sources to the second number of sources.

10. The method of claim 6 comprising:
 determining whether item confidence value for the item is beyond a threshold value; and
 providing the attribute error signal indicating the error with the first attribute of the item if the determined item confidence value is beyond the threshold value.

11. A method by a computing device communicatively coupled to a database and a plurality of sources, wherein each of the plurality of sources comprise at least one server, the method comprising:
 determining an attribute confidence value for a first attribute of an item based on a first number of sources of the plurality of sources reporting a first attribute value for the item and on a second number of sources of the plurality of sources reporting any other attribute value for the item;
 obtaining, from the database, a first source weight for a first source of the first number of sources;
 applying the first source weight to the attribute confidence value to generate an adjusted attribute confidence value;
 determining an item confidence value for the item based, at least partially, on the adjusted attribute confidence value for the first attribute of the item;
 storing the item confidence value for the item in the database;
 generating an attribute error signal indicating an error with the first attribute value based on the determined item confidence value;
 transmitting the attribute error signal to the first source of the first number of sources to adjust the first attribute value based on the indicated error;
 adjusting the attribute confidence value based on whether previously received attribute values from the first source are correct;
 determining the item confidence value for the item based, at least partially, on the adjusted attribute confidence value;
 determining a ratio of the plurality of sources that have provided a same attribute value for each of the previously received attribute values; and
 determining, for each of the previously received attribute values, that they are correct if the determined ratio is beyond a threshold value.

12. The method of claim 11, comprising:
 receiving a first weight for the first attribute of the item;
 adjusting the first weight based, at least partially, on the determined attribute confidence value for the first attribute of the item; and
 determining the item confidence value for the item based, at least partially, on the adjusted first weight.

13. The method of claim 11, wherein applying the first source weight to the attribute confidence value to generate the adjusted attribute confidence value comprises:
 adjusting the first source weight based, at least partially, on the first number of sources and the second number of sources;
 storing the adjusted first source weight in the database; and
 applying the adjusted first source weight to the attribute confidence value to generate the adjusted attribute confidence value.

14. The method of claim 11, comprising determining the attribute confidence value for the first attribute of the item based on a ratio of the first number of sources to the second number of sources.

* * * * *